(No Model.)
N. LEIDGEN.
LOCK NUT.
No. 529,034. Patented Nov. 13, 1894.
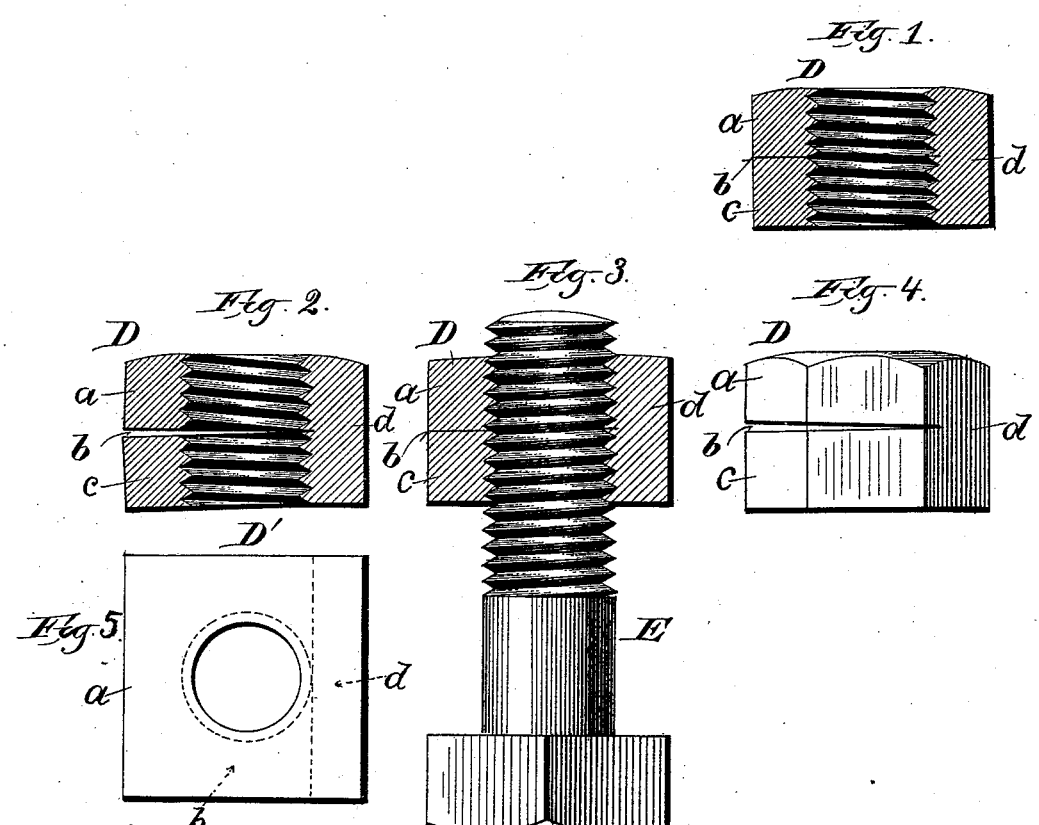

UNITED STATES PATENT OFFICE.

NICOLAUS LEIDGEN, OF MILWAUKEE, WISCONSIN, ASSIGNOR OF ONE-HALF TO OTTO GELHAAR, OF SAME PLACE.

LOCK-NUT.

SPECIFICATION forming part of Letters Patent No. 529,034, dated November 13, 1894.

Application filed April 2, 1888. Serial No. 269,305. (No model.)

*To all whom it may concern:*

Be it known that I, NICOLAUS LEIDGEN, of the city and county of Milwaukee, and State of Wisconsin, have invented certain new and useful Improvements in Lock-Nuts; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to produce an elastic self locking nut which may be repeatedly turned on or off from a male thread without injury thereto or to the female thread in the nut itself.

It consists essentially of a nut composed of two parts separated by a cleft extending from one side of the nut transversely through the threaded hole therein and joined together on the opposite side of the nut by an elastic connection which tends to automatically separate the component parts and to spread or distort the thread between them, the thread in the two parts being continuous and unbroken when the cleft is closed and they are brought together.

In the accompanying drawings like letters designate the same parts in the several figures.

Figure 1 is an axial section of my improved lock nut, showing the cleft closed and the component sections of the nut brought together. Fig. 2 is a like section of the nut showing the cleft open and the component parts separated on one side of the threaded hole. Fig. 3 is a similar view of the nut as applied to a bolt, the component sections being drawn together by the male thread of the bolt. Fig. 4 is a side elevation of a finished hexagonal nut; and Fig. 5 is a plan view of a square nut embodying my invention.

Referring to Figs. 1 to 4 inclusive of the drawings, D designates a nut as a whole embodying my invention. It consists of two parts, *a* and *c*, separated by a cleft *b*, extending from one side or edge of the nut approximately parallel with the faces of the nut into or through the threaded hole therein, so as to sever the screw thread in a plane approximately coincident or parallel with one of its turns. The component parts of the nut are joined or united on one side of the threaded hole by an elastic connection *d*, which tends to open the cleft and separate the parts, thus spreading or distorting the thread between the two parts.

The screw thread in each part is made continuous with that in the other, and when the cleft is closed and the parts are brought together, there is no break, interruption or distortion in the thread between the parts.

By severing the thread in the manner specified approximately parallel with its turns, sharp cutting edges or projections, and the consequent stripping or mutilation of the male thread on which the nut is turned are avoided, making it feasible to use the nut or a bolt to which it has been applied, over and over again.

In Fig. 5, D' designates a square nut made in accordance with my invention, the straight dotted line indicating the termination or bottom of the cleft which separates the component sections, and the circular dotted line indicating the depth of the screw thread.

A nut thus constructed may be screwed upon a bolt E, or male thread in the usual way. The bolt or male thread engaging the female thread in both parts of the nut, draws the same together, closing the cleft *b*. The spring or resiliency of the elastic connection *d*, joining the component parts of the nut tending to separate them, causes the thread therein to bear in opposite directions and bind upon the bolt or male thread and thereby prevent the nut from being easily turned thereon. When part *c* of the nut is turned into engagement with a bearing surface and is subjected to strain, the other part *a*, is forced against it and acts as a jam nut, thereby preventing the nut from becoming loosened by jarring or otherwise.

To facilitate turning the nut into place upon a bolt or male thread, the component parts may be forced and held together by any suitable means during the operation, and released when the nut is turned into place, but in practice I have not found it necessary to employ such means, the thread in the outer part *a*, readily catching and following the bolt or male thread without injury thereto. The tendency of the two parts to separate and thus bind and hold the nut in place upon the bolt or male thread, does not diminish the efficiency or strength of the nut, because the spreading tendency exerted through the thread in the outer part $a$, acts in the same direction as the thread in the inner part $b$, upon the bolt or male thread when strain is exerted in opposite directions upon the bolt or screw and upon the nut, and the component parts of the nut are thus forced together.

I claim—

1. An elastic lock nut, composed of two parts separated by a cleft extending from one side of the nut transversely through the threaded hole therein, and joined together on the opposite side of the nut by an elastic connection which tends to automatically separate the component parts and to spread or deflect the thread between them, the thread in the two parts being continuous and unbroken when the cleft is closed and they are brought together, substantially as and for the purposes set forth.

2. An elastic lock nut composed of two parts, separated by a cleft extending from one side of the nut approximately parallel with its faces through the threaded hole therein, the two parts being joined together on one side of said hole by an elastic connection which tends to separate them and thereby produce a break in or distortion of the thread, the screw thread in each part of the nut being continuous with that in the other part when the cleft is closed and the two parts are forced together, substantially as and for the purposes set forth.

In testimony that I claim the foregoing as my own I affix my signature in presence of two witnesses.

NICOLAUS LEIDGEN.

Witnesses:
CHAS. L. GOSS,
M. E. BENSON.